United States Patent [19]

Cooper et al.

[11] Patent Number: 4,563,607
[45] Date of Patent: Jan. 7, 1986

[54] RADIAL CLAMP ASSEMBLY FOR DYNAMOELECTRIC MACHINE STATOR COIL END TURNS

[75] Inventors: Glenn D. Cooper; Charles M. Rowe, both of Orlando; Henry M. Holly, III, Casselberry, all of Fla.

[73] Assignee: Westinghouse Electric Corp., Pittsburgh, Pa.

[21] Appl. No.: 609,254

[22] Filed: May 11, 1984

[51] Int. Cl.[4] .............................................. H02K 3/46
[52] U.S. Cl. ........................................ 310/260; 310/42
[58] Field of Search ........................... 310/42, 260, 270

[56] References Cited

U.S. PATENT DOCUMENTS

| | | | |
|---|---|---|---|
| 3,024,302 | 3/1962 | Coggeshall | 310/260 X |
| 3,089,048 | 5/1963 | Bahn et al. | 310/260 |
| 3,344,296 | 9/1967 | Coggeshall et al. | 310/260 |
| 3,348,085 | 10/1967 | Coggeshall et al. | 310/260 |
| 3,665,234 | 5/1972 | Bishop | 310/260 |
| 3,949,256 | 4/1976 | Cooper et al. | 310/260 |
| 3,949,257 | 4/1976 | Cooper et al. | 310/260 |
| 4,238,339 | 12/1980 | Khutoretsky et al. | 310/260 |

*Primary Examiner*—Mark O. Budd
*Attorney, Agent, or Firm*—G. H. Telfer

[57] ABSTRACT

A mechanical clamping assembly and the method of its application for use on the stator end windings of large steam turbine generators is provided that can be fit in the mid-involute region of the end winding, including any existing machines as may be in use in the field as well as in original manufacture. The invention maintains pressure contact between coils and strain blocks and eliminates the freedom of the coils to vibrate relative to the total end basket assembly. The method comprises steps of forming a loop of impregnated banding material that extends through apertures of support blocks that span a pair of adjacent top and bottom coils, inserting pins in the ends of the loop, twisting a pin, curing the banding material, pulling on a pin to pretension the banding and shimming the pulled pin so that upon its release a tight assembly is provided.

3 Claims, 3 Drawing Figures

RADIAL CLAMP ASSEMBLY FOR DYNAMOELECTRIC MACHINE STATOR COIL END TURNS

BACKGROUND AND SUMMARY OF THE INVENTION

This invention relates to dynamoelectric machine end turn support assemblies and methods for making them.

Despite substantial improvements, there is a continuing desire for better end winding bracing of machines such as large turbine generators to minimize excessive vibration, wear of coil insulation, and fatigue cracking of series and copper strand phase connections. Examples of prior arrangements are those presented in Cooper et al U.S. Pat. Nos. 3,949,256 and 3,949,257, issued Apr. 6, 1976, which are incorporated by reference herein.

What is sought to be improved is to avoid loosening of strain blocks between top and bottom coil layers by radially clamping the top layer to the bottom layer in a relatively permanent tight assembly. The clamping should maintain pressure contact between coils and strain blocks and eliminate vibration of individual coils relative to the total coil end basket.

The present invention provides radial clamps located in the mid involute region of the end turns, that is, approximately midway between the core and the coil ends, to provide basket integrity in this region of a quality as has been previously provided by glass fiber reinforced rings at the coil extremities. It is particularly desired to provide such radial clamps by a method of assembly that ensures against their becoming loose and one that can be readily practiced in the field as well as in original manufacture.

The method for forming a radial clamp assembly in accordance with this invention includes placing a support block on two adjacent top coil end turns and another support block on two adjacent bottom coil end turns with each of the support blocks having an aperture with the apertures on a line passing between the two top coils and the two bottom coils. Then a loop of banding material is passed through the apertures in the support blocks and through the space between coils. The banding loop has some excess length extending beyond each of the support blocks. A pin is inserted within each end of the banding loop. At least one of the pins is turned to twist the banding loop so as to take up slack in the loop with the pins then bearing against the adjacent support blocks in a semi-tight assembly. Resin with which the banding is impregnated is then cured, such as by flow of hot air.

After the banding is so positioned and cured, a device, such as a hydraulic jack, is used to pull at least one of the pins radially away from the coils. This stretches the loop of banding material and puts additional tension on it. Then shims are placed between that pin and the adjacent block so the banding remains in tension upon release of the pulling device.

It is further desirable to place a layer of resin impregnated conformable material between each of the top and bottom support blocks and the coils adjacent thereto when the blocks are put in place. The resin in the layers of conformable material is cured along with the resin of the banding material.

Another aspect is to have springs, such as spring washers or spring plates, between one of the pins and the adjacent block and to use the pulling device and shimming on the other one of the pins.

The method described above results in an improved radial clamping arrangement for stator coil end turns, particularly for the mid-involute region of the end turns, comprising two support blocks between which a pair of top coils and a pair of bottom coils are clamped. The support blocks have a loop of banding material, that is twisted, cured and pretensioned, running through central apertures in them and in the space between the adjacent coils. Each end of the loop is over a transverse pin that bears against one of the support blocks. The clamping arrangement gives relatively permanent tightness to the coils and is advantageous in being readily applied in the field as well as in original manufacture to prevent vibration of the turns.

DESCRIPTION OF THE PREFERRED EMBODIMENTS

Figure 1:
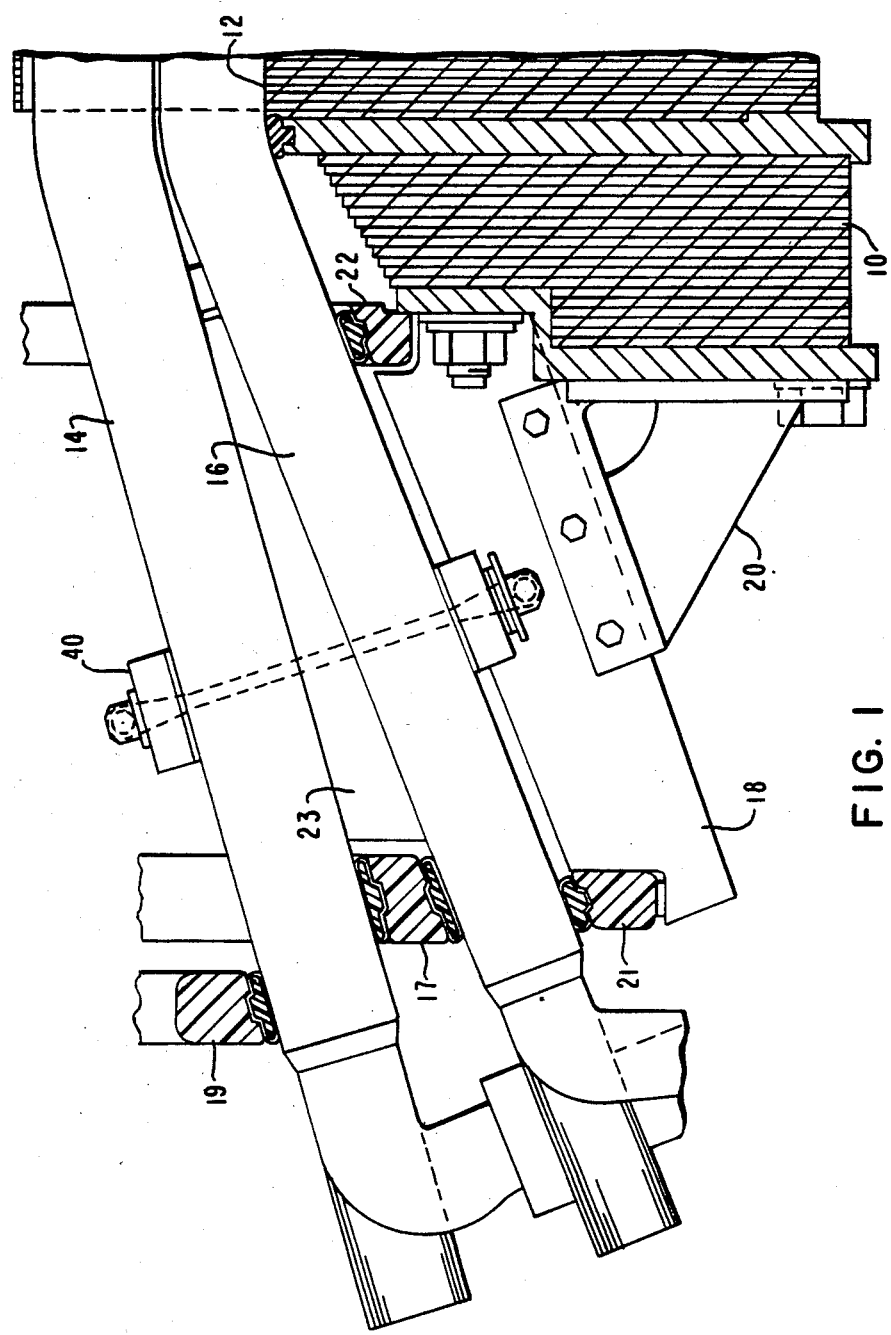
FIG. 1 is a side view of a stator coil end turn assembly of a dynamoelectric machine with a radial clamp assembly in accordance with the present invention.

FIG. 1 illustrates a dynamoelectric machine with a radial clamping device in accordance with the present invention. It shows the end winding portion of a turbine generator that includes a stator iron core 10 with slots 12 containing coils that include a top coil 14 and a bottom coil 16, referring respectively to the top and bottom of the slots, which extend beyond to core 10 into the end turn region of the machine. The coils 14 and 16 are supported in an arrangement that includes, in this example, a number of braces 18 extending over the end turns and brackets 20 that are attached to the brace as well as to the core 10.

Other coil support members include a number of rings 17, 19, 21 and 22, and a number of strain blocks 23 between top coils 14 and bottom coils 16.

Figure 2:
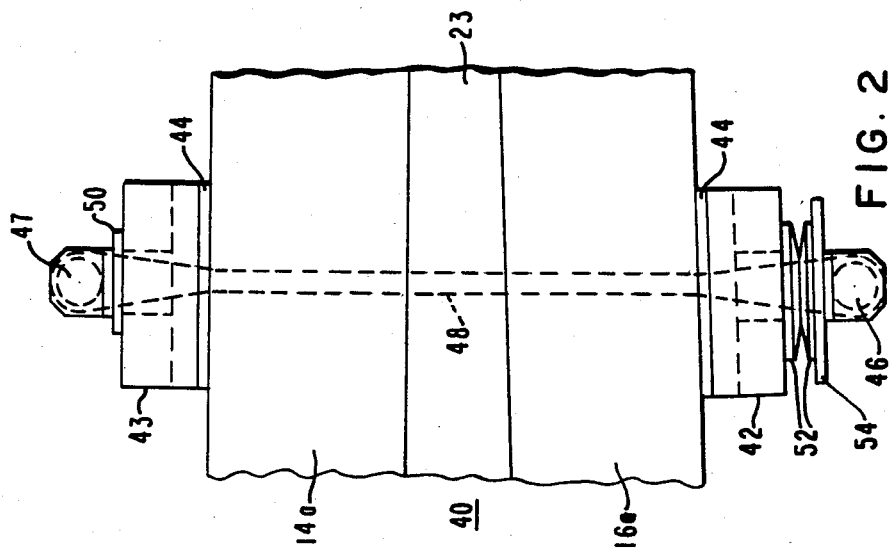
FIG. 2 is an enlarged and more detailed side view of a radial clamp assembly suitable for use in the combination of FIG. 1.

In accordance with this invention, a radial clam 40 is applied in the mid-involute region between the axial extreme of the end winding and the core. The radial clamp 40 is illustrated here primarily to show its general location in the overall combination and is better shown in FIGS. 2 and 3. It is referred to as a "radial" clamp because it extends in substantially a radial direction in relation to the axis of the machine (a horizontal line in FIG. 1). The clamp 40 does, however, have an angle to a direct radius (which is vertical in FIG. 1) because of the outward tilt of the end turns 14 and 16.

It will be understood that a certain amount of artistic license has been exercised in the figures that is consistent with common practice in showing end turn support arrangements. The end turns actually are curved into and out of a plane through the axis of the machine rather than directly axially extending as implied by the drawing. The top and bottom coils normally curve in opposite directions and are joined, respectively, to another bottom coil and another top coil from different slots. Thus, the radial clamp 40 clamps together two parallel top coils and two parallel bottom coils but with the top and bottom coils, in the mid-involute region of the end turns, being more nearly perpendicular to each other rather than parallel. The relative angle between the top and bottom coils does not affect the utility of the radial clamp 40.

Strain blocks 23 occur at various locations in the mid-involute position of the end turns to provide support between a top coil 14 and a bottom coil 16. The radial clamp 40 passes between adjacent top coils and between adjacent bottom coils so it does not need to pass through a strain block 23.

Figure 3:
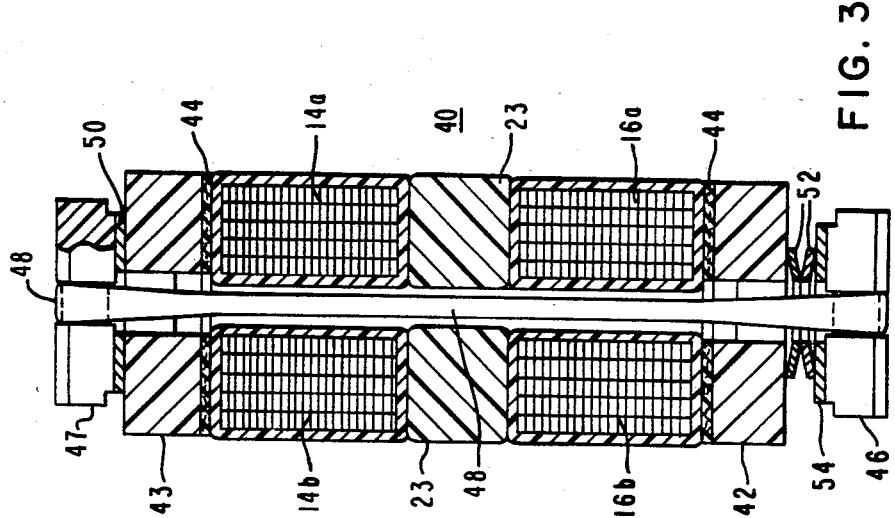
FIG. 3 is a front view of a radial clamp assembly in accordance with FIG. 2.

As shown in FIGS. 3 and 4, support blocks 42 and 43 are located respectively radially below and above an adjacent pair of end turns so that one block 43 bears against two bottom coils 16a and 16b and the other block 42 bears against two top coils 14a and 14b, preferably.

Each of the support blocks 42 and 43 spaced from the adjacent coils by a layer 44 of conformable material such as a Dacron felt material that has been resin treated.

Pins 46 and 47 are respectively disposed across each support block 42 and 43 transverse to the direction in which the coils run. A banding material 48 is disposed in a continuous loop around the pins 46 and 47 on each side of the coils so that the banding bears against the pins which in turn bear against their adjacent support blocks and the coils. There is a shim 50 located between the pin 47 and the support block 43 and there are springs 52, such as spring washers or a spring plate, and a support washer 54 disposed between the pin 46 and its support block 42.

It is significant to the practice of the invention that the banding 48 is pretensioned. It is also preferred that the banding be resin impregnated, such as of a glass fiber reinforced-epoxy resin impregnated material.

The method used to assemble the radial clamping device 40 makes it tight and protects against it becoming loose.

The method for forming a radial clamp assembly in accordance with this invention includes placing a support block on two adjacent top coil end turns and another support block on two adjacent bottom coil end turns with each of the support blocks having a radially extending aperture with the apertures on substantially a radial line passing between the two top coils and the two bottom coils. Then a loop of banding material is passed through the apertures in the support blocks and through the space between coils. The banding loop has some excess length extending beyond each of the support blocks. A pin is inserted within each end of the banding loop. At least one of the pins is turned to twist the banding loop so as to take up slack in the loop with the pins then bearing against the adjacent support blocks in a semi-tight assembly. Resin with which the banding is impregnated is then cured, such as by flow of hot air.

After the banding is so positioned and cured, a device, such as a hydraulic jack, is used to pull at least one of the pins radially away from the coils. This stretches the loop of banding material and puts additional tension on it. Then shims are placed between that pin and the adjacent block so that the banding remains in tension upon release of the pulling device.

The banding material 48 may be a resin impregnated glass fiber banding that has a width of about ½ inch which extends radially through the end winding vent space and is held in place by fiberglass support blocks 42 and 43 and pins 46 and 47. Curing of the banding forms it into a solid and stiff member which is pretensioned to about 5000 lbf via a hydraulic jack and shimmed in place.

The radial clamping assembly 40 applied in accordance with the present invention substantially tightens the coils in the mid-involute region. The assembly may be used on various ones of the end turns but need not be used on all of them to provide substantial improvement.

A particular aspect of the invention that is desirable is that it is applicable to machines already in the field, that is the assembly method of the radial clamping device is one that can be readily practiced in the field as well as in the factory of the original manufacturer. This means that machines after field operation in which there has been loosening of the original end turn supporting components can be substantially improved in their performance by the application of a radial clamping device in accordance with this invention.

While the clamping device as shown if subsequently loosened can be readily cut off and replaced with a new one, the loosening of the assembly is not contemplated by this design. Loosening due to creep relaxation is controlled by the spring constant of the glass band and, if desired, further insurance can be supplied by the spring washers or spring plates. Thus it is believed that there is substantially permanent clamping provided by this arrangement.

The practice of the invention may be varied from that shown and described while consistent with the general principles thereof.

I claim:

1. A dynamoelectric machine comprising:
   a stator core with slots therein and top and bottom coils contained in each of said slots and extending from the end of said core;
   a radial clamp securing a pair of adjacent top coils together with a pair of bottom coils and comprising a top support block radially inside said pair of top coils and a bottom support block radially outside said pair of bottom coils, each of said support blocks having a central aperture, said apertures being on a substantially radial line in relation to the axis of the machine;
   a radially extending, cured and pretensioned loop of resin impregnated banding material running through said central apertures of said blocks;
   a transverse pin respectively on each of said support blocks, an end of said loop being disposed over each of said pins and holding said pins in tight engagement with said blocks and said coils;
   said loop being twisted in a portion thereof between said pins;
   a shim located between one of said pins and its adjacent block; and springs located between the other of said pins and its adjacent block.

2. A dynamoelectric machine in accordance with claim 1 wherein: said top and bottom coils are spaced from each other by strain blocks.

3. A dynamoelectric machine in accordance with claim 1 further comprising:
   a layer of conformable material is disposed between each of said support blocks and its adjacent coils.

* * * * *